United States Patent
Ji et al.

(10) Patent No.: US 9,884,994 B2
(45) Date of Patent: Feb. 6, 2018

(54) METHOD FOR PREVENTING SOIL EROSION

(71) Applicants: RHODIA OPERATIONS, Paris (FR); INSTITUTE OF SOIL AND WATER CONSERVATION, CHINESE ACADEMY OF SCIENCES & MINISTRY OF WATER RESOURCES, Yangling, Shaanxi (CN)

(72) Inventors: Pengfei Ji, Shanghai (CN); Galder Cristobal, Shanghai (CN)

(73) Assignees: RHODIA OPERATIONS, Paris (FR); INSTITUTE OF SOIL AND WATER CONSERVATION, CHINESE ACADEMY OF SCIENCES & MINISTRY OF WATER RESOURCES, Yangling, Shaanxi (CN)

( * ) Notice: Subject to any disclaimer, the term of this patent is extended or adjusted under 35 U.S.C. 154(b) by 0 days.

(21) Appl. No.: 14/437,618

(22) PCT Filed: Oct. 23, 2012

(86) PCT No.: PCT/CN2012/083347
§ 371 (c)(1),
(2) Date: Apr. 22, 2015

(87) PCT Pub. No.: WO2014/063300
PCT Pub. Date: May 1, 2014

(65) Prior Publication Data
US 2015/0353825 A1   Dec. 10, 2015

(51) Int. Cl.
*C09K 17/00* (2006.01)
*C09K 17/32* (2006.01)
*E02D 3/00* (2006.01)
*E02D 3/12* (2006.01)

(52) U.S. Cl.
CPC ............. *C09K 17/32* (2013.01); *E02D 3/00* (2013.01); *E02D 3/126* (2013.01)

(58) Field of Classification Search
CPC ............ C09K 17/32; E02D 3/00; E02D 3/126
See application file for complete search history.

(56) References Cited

U.S. PATENT DOCUMENTS

| | | | |
|---|---|---|---|
| 3,950,179 A | 4/1976 | Schneider | |
| 5,801,116 A | 9/1998 | Cottrell et al. | |
| 2004/0069031 A1 | 4/2004 | Krysiak et al. | |
| 2008/0050176 A1* | 2/2008 | Amarena | C04B 26/04 404/32 |
| 2011/0003936 A1 | 1/2011 | Chen et al. | |
| 2013/0129639 A1* | 5/2013 | Anderson | A61K 8/737 424/47 |

FOREIGN PATENT DOCUMENTS

| | | |
|---|---|---|
| CN | 102480922 A | 5/2012 |
| EP | 0267034 A2 | 5/1988 |
| JP | H4-277598 A | 10/1992 |
| JP | H08099090 A | 4/1996 |
| JP | H9-267002 A | 10/1997 |
| JP | 2007-204732 A | 8/2007 |
| SU | 1595871 A1 | 9/1990 |
| WO | 2004035633 A2 | 4/2004 |
| WO | 2011/002521 A1 | 1/2011 |
| WO | 2012/022164 A1 | 2/2012 |

OTHER PUBLICATIONS

Pimentel, David, et al. "Soil erosion threatens food production" Agriculture 2013, 3, 443-463; doi:10.3390/agriculture3030443, Aug. 2013.*
Minnesota Department of Natural Resources "Soil Erosion Susceptability" http://www.dnr.state.mn.us/whaf/about/scores/geomorphology/soil_erodibilty.html accessed Feb. 2017.*
European Office Action dated Jun. 17, 2016 for EP Patent Application No. 12887230.6 to Rhodia Operation, et al.

* cited by examiner

*Primary Examiner* — John J Kreck
(74) *Attorney, Agent, or Firm* — Vorys, Sater, Seymour and Pease LLP

(57) ABSTRACT

Provided is a method for preventing soil erosion in which a nonionic guar and/or a cationic guar is applied on or into the soil. A method for preventing water runoff of a soil in which a nonionic guar and/or a cationic guar is applied on or into the soil is also provided. A treated soil against the soil erosion susceptible to be obtained by the method for preventing soil erosion in which a nonionic guar and/or a cationic guar is applied on or into the soil is also provided.

20 Claims, No Drawings

METHOD FOR PREVENTING SOIL EROSION

This application is a U.S. national phase entry under 35 U.S.C. § 371 of International Application No. PCT/CN2012/083347, filed on Oct. 23, 2012, the entire content of which is being incorporated herein by reference for all purposes.

The present invention concerns a method for preventing soil erosion in which a nonionic guar and/or a cationic guar is applied on or into the soil. The invention also concerns a method for preventing water runoff of a soil in which a nonionic guar and/or a cationic guar is applied on or into the soil. The invention also relates to a treated soil against the soil erosion susceptible to be obtained by the method for preventing soil erosion in which a nonionic guar and/or a cationic guar is applied on or into the soil.

BACKGROUND OF THE INVENTION

Water and soil is the material basis of human being. Soil erosion is a major environmental issues of common concern nowadays. Especially in the vast developing countries, soil erosion has become an important restricting factor in local economic development. Soil erosion induces serious environmental and ecological disaster consequences including soil quality degradation, destruction of land resources, water scarcity, water pollution, environmental degradation and sediment discharged to produce a large number of river siltation, increased risk of floods to threat downstream area.

Chemical erosion control technology is emerging as a class of non-traditional soil and water conservation measures. Chemical controls soil erosion primarily through the application of polymers to improve soil properties, increase soil aggregate stability, to prevent clay dispersion thus reduce the soil crust, increase infiltration, reduce surface runoff and soil erosion. Synthetic polymer were started to used in soil improvement from 1950s. During the researching work, PAM (polyacrylamide) was proved a promising additive to maintain soil structure and soil aggregate stability as well as maintain high infiltration, low runoff (U.S. Pat. No. 2,625,529, WO2007047481). Celluloses and water absorbent lignine cellulose (US20100285962, US20070180763) were also identified for such a purpose. Up to now only polyacrylamides have been intensively investigated for on soil erosion prevention and its role in agriculture in a large number of countries. The results indicated that the effect of water and soil conservation has its application scope, like gentle slope and some types of soil. However for the land with poor texture or alkaline soil and on steep slopes PAM can not work well. Therefore, more effective soil erosion control materials and techniques are to be further developed to meet the diverse, ever-changing requirements in different types of soil and environment.

Accordingly, there is a need for an improved soil additive to prevent the soil erosion and having an increased efficacy, relative to the total amount of additive used.

DETAILED DESCRIPTION

It appears now that the nonionic guars and/or cationic guars may be used to prevent the soil erosion and having an increased efficacy, relative to the total amount of additive used; notably by increasing the water-stability of soil aggregates. Moreover the guars are plant-based biodegradable products that do not pollute the environment as a result of degradation.

The present invention concerns then a method for preventing soil erosion in which a nonionic guar and/or a cationic guar is applied on or into the soil.

The invention also concerns a method for preventing water runoff of a soil in which a nonionic guar and/or a cationic guar is applied on or into the soil.

The present invention also relates to a treated soil against the soil erosion susceptible to be obtained by the method for preventing soil erosion in which a nonionic guar and/or a cationic guar is applied on or into the soil.

Soil erosion according to the present invention intends to concern the three primary types of erosion that occur as a direct result of rainfall, such as sheet erosion, rill erosion, and gully erosion; but also as a result of wind and weather conditions.

Surface runoff is the water flow that occurs when the soil is infiltrated to full capacity and excess water from rain, meltwater, or other sources flows over the land. This is a major component of the water cycle, and the primary agent in water erosion. It induces a loss of tilth and the soil could not then provide a sufficient proper structure and nutrients for crops and seeds to healthy grow.

One or several nonionic and/or cationics guar(s) may be used according to the present invention.

Nonionic guars of the invention are generally non modified guars, which mean a polysaccharide composed of the sugars galactose and mannose. The backbone is a linear chain of β1,4-linked mannose residues to which galactose residues are 1,6-linked at every second mannose, forming short side-branches.

Cationic guars of the invention may include cationic guars that may be obtained by the use of different possible cationic etherifying agents, such as for example the family of quaternary ammonium salts.

In the case of cationic guars, the cationic group may be then a quaternary ammonium group bearing 3 radicals, which may be identical or different, preferably chosen from hydrogen, alkyl, hydroxyalkyl, epoxyalkyl, alkenyl, or aryl, preferably containing 1 to 22 carbon atoms, more particularly 1 to 14 and advantageously 1 to 3 carbon atoms. The counterion is generally a halogen, which is one embodiment is chlorine.

Quaternary ammonium salts may be for example: 3-chloro-2-hydroxypropyl trimethyl ammonium chloride (CHPTMAC), 2,3-epoxypropyl trimethyl ammonium chloride (EPTAC), diallyldimethyl ammonium chloride (DMDAAC), vinylbenzene trimethyl ammonium chloride, trimethylammonium ethyl metacrylate chloride, methacrylamidopropyltrimethyl ammonium chloride (MAPTAC), and tetraalkylammonium chloride.

A typical cationic functional group in these cationic guar derivatives is trimethylamino(2-hydroxyl)propyl, with a counter ion. Various counter ions can be utilized, including but not limited to halides, such as chloride, fluoride, bromide, and iodide, sulfate, methylsulfate, and mixtures thereof.

Cationic guars of the present invention may be chosen in the group consisting of:
- cationic hydroxyalkyl guars, such as cationic hydroxyethyl guar (HE guar), cationic hydroxypropyl guar (HP guar), cationic hydroxybutyl guar (HB guar), and
- cationic carboxyalkyl guars including cationic carboxymethyl guar (CM guar), cationic alkylcarboxy guars such as cationic carboxylpropyl guar (CP guar) and cationic carboxybutyl guar (CB guar), carboxymethylhydroxypropyl guar (CMHP guar).

More preferably, cationic guars of the invention are guars hydroxypropyltrimonium chloride.

The degree of hydroxyalkylation (molar substitution or MS) of cationic guars, that is the number of alkylene oxide molecules consumed by the number of free hydroxyl functions present on the guar, may be comprised between 0 and 3, preferably between 0 and 1.7. As example, a MS of 1 may represent one ethylene oxide unit per monosaccharide unit.

The Degree of Substitution (DS) of cationic guars, that is the average number of hydroxyl groups that have been substituted by a cationic group per monosaccharide unit, may be comprised between 0.005 and 3, preferably between 0.01 and 2. DS may notably represent the number of the carboxymethyl groups per monosaccharide unit. DS may notably be determined by titration.

The Charge Density (CD) of cationic guars may be comprised between 0.1 and 2 meq/g, preferably between 0.4 and 1 meq/g. The charge density refers to the ratio of the number of positive charges on a monomeric unit of which a polymer is comprised to the molecular weight of said monomeric unit. The charge density multiplied by the polymer molecular weight determines the number of positively charged sites on a given polymer chain.

The cationic guar may have an average Molecular Weight (Mw) of between about 100,000 daltons and 3,500,000 daltons, preferably between about 500,000 daltons and 3,500,000 daltons.

Dosage of the non-ionic and/or cationic guar of the present invention may be comprised between 0.1 and 100 kg/ha of soil, more preferably between 2.5 and 50 kg/ha of soil.

Application on or into the soil according to the invention may notably be carried out by spray to the soil or blend with the soil.

The soil additive can, for example, be applied to the surface or near the top surface of the soil, into the soil or into a layer within the soil, in irrigation water or other carrier that is then applied to the soil, or the like.

Soil spray occurs when the additives are prepared into solutions and sprayed on the soil surface. The solutions will infiltrate through top layer of soil to some extend to form a crust like tough layer on soil. The soil particles in this layer are bound by additive thus possess strong detachment resistance ability. Also this layer is able to offer faster water infiltration kinetics so surface runoff could be reduced significantly. Guars of the invention may be dissolved and/or in suspension within said solutions.

Blending occurs when the additives are set on soil surface and homogenized by mixing. Guars of the invention may be used in a liquid or solid shape. Powder casting is preferred according to this embodiment. This protocol also shows the same performance as the first protocol.

The guar based additive may also several classic additives used in the agricultural and horticultural activities, such as pigments, adjuvants, surfactants, and/or fertilizers.

Various types of soil may be used according to the process of the present invention such as clay, sediments, sand, loam, silt, farm yard manure, silt, peat and ordinary soils usually involved in the production of corn, wheat, sorghum, soybean, tomato, cauliflower, radish, cabbage, canola, lettuce, rye grass, grass, rice, cotton, sunflower and the like.

Soils used in the present invention are preferably chosen in the group consisting of: clay soils, sandy soils, silty soils, peaty soils, and loamy soils.

Clay (or Clayey) Soil: When clay soils are wet they are generally sticky, lumpy and pliable but when they dry they generally form hard clots. Clay soils are composed of very fine particles with few air spaces, thus they are hard to work and often drain poorly—they are also prone to water logging in spring. Blue or grey clays have poor aeration and must be loosened in order to support healthy growth. Red color in clay soil indicates good aeration and a "loose" soil that drains well. As clay contains high nutrient levels plants grow well if drainage is adequate. Generally, clay soils have a mean particle diameter ($D_{50}$) of less than 50 micrometers. Typically, clay soils have a mean particle diameter ($D_{50}$) of about or less than 25 micrometers. More typically, clay soils have a mean particle diameter of about or less than 5 micrometers.

Sandy Soils: Generally, sandy soils have a gritty texture and are formed from weathered rocks such as limestone, quartz, granite, and shale. Sandy soils can contain sufficient to substantial organic matter, which makes it relatively easy to cultivate. Sandy soil is generally characterized by round grains with particle sizes ranging from 100 micrometers to 2000 micrometers.

Silty Soil: Generally, silty soil is considered to be among the more fertile of soils. Silty soil is generally composed of minerals, predominantly quartz, and fine organic particles, and it has more nutrients than sandy soil offers good drainage. When dry it has rather a smooth texture and looks like dark sand.

Peaty Soil: Peaty soil generally contains more organic material than other soils because its acidity inhibits the process of decomposition. This type of soils contains fewer nutrients than many other soils and is prone to over-retaining water.

Loamy Soil: Generally, loamy soils are a combination of roughly 40% sand, 40% silt and 20% clay. Loamy soils can range from easily workable fertile soils full of organic matter, to densely packed sod.

For further clarification, instruction, and description of the concepts above, embodiments of the present invention are now illustrated and discussed in connection with the following examples and experimental results.

EXAMPLES

Used compounds are the following:

Guar A: Hydroxypropyl guar hydroxypropyltrimonium chloride. DS of 0.10, Mw of 1.5 M daltons and CD of 0.5 meq/g Guar B: Non modified guar. DS of 0, Mw of 2 M Daltons and CD of 0 meq/g.

The erosion tests were carried out under artificial rain and on a plot which can easily change to different slopes. The plot is the size of 120 cm×40 cm, on which the soil carefully and homogenously placed. The slope of the plot can be well controlled. The soil tested is clayey soil coming from Shaanxi province where suffered the severe soil erosion problem. The dosage tested in experiments ranged from 10 kg/ha to 50 kg/ha.

The artificial rain falls from 16 meters high and intensity (mm/min) can be controlled precisely. Each test lasts 40 minutes.

Table 1 below indicates the time from very beginning of raining to the starting moment of surface water runoff. Soil loss is the total loss during the whole test. Rain intensity: 1 mm/min. slope: 10 degree.

TABLE 1

| Treatment (additive) | Time (min) | Runoff layer depth (mm) | Soil loss (kg/m²) | Soil loss decreased (%) |
|---|---|---|---|---|
| Control | 7.27 | 12.97 | 0.15 | — |
| Guar A (1 g/m²) | 12.00 | 4.71 | 0.09 | 43.61 |
| Guar A (3 g/m²) | 17.26 | 6.79 | 0.07 | 56.11 |
| Guar A (5 g/m²) | 0.50 | 3.89 | 0.07 | 64.67 |
| Guar B (3 g/m²) | 0.52 | 13.97 | 0.08 | 47.83 |

As shown in Table 1, the two additives have different performances regarding to runoff time and runoff water layer depth. But both of them show the same soil loss reduction effect. Guar A can dramatically increase the time before the happening of runoff, which indicates Guar A can make soil more permeable for water. On the contrary, guar B makes the water penetration in the soil slower, thus the runoff shows up very fast, even faster than control soil. The runoff depths also show the same trend. Due to better infiltration, the guar A treated soil has thinner runoff water layer on its surface. Control soil gives thicker runoff layer while guar B treated soil has the thickest runoff layer on surface.

It's interesting that both Guars A and B can significantly decrease the soil loss, thus resist the erosion effectively. The higher infiltration rate and binding force of guar A contribute to this anti-erosion performance. As for guar B, the strong adhesive force it brings to soil can also reduce erosion even it can not better other parameters.

The performances of guar A with different dosages clearly shows that at very low dosage (10 kg/ha) the runoff time could be effectively lagged. The runoff layer depth plus soil loss are reduced as well. As the dosage is increased to 30 kg/ha, performance gets better than one with lower dosage. When dosage goes up to 50 kg/ha, the runoff time gets much earlier than ones with low dosage and control soil. Too much guar A can counter hydrophilicity of soil but bring higher binding force. In this case, the binding force that makes soil particle aggregate is the main reason for soil loss reduction.

Table 2 below shows the performances of different guar A dosages under harsh conditions. Raining intensity: 2 mm/min. slope: 20 degree.

TABLE 2

| Treatment (additive) | Time (min) | Runoff layer depth (mm) | Soil loss (kg/m²) | Soil loss decreased (%) |
|---|---|---|---|---|
| Control | 0.40 | 47.34 | 1.02 | |
| Guar A (1 g/m²) | 1.38 | 41.13 | 0.59 | 41.78 |
| Guar A (3 g/m²) | 0.18 | 38.96 | 0.25 | 75.74 |
| Guar A (5 g/m²) | 0.16 | 40.26 | 0.27 | 73.16 |

It appears then that at harsh conditions with sharp slope and intensive raining, the runoff happens fast for all the treatments. Soil treated by guar A shows runoff layer decrease effect but is much lower than the one it shows at mild conditions. However, the anti-erosion performance is as good as the one at mild conditions for low dosed soil and even better for high dosed soil. Due to the harsh condition, the infiltration rate can slightly affect the surface runoff because speed of water running down is much faster than infiltrating to soil. In this case, the significantly soil loss decrease can be mainly ascribe to good binding force additive brings to soil particles. This could also be confirmed by higher dosage showing lower soil loss behaviour.

What is claimed is:

1. A method for preventing soil erosion of soil, the method comprising applying on or in the soil a cationic guar,
    wherein charge density of the cationic guar is between 0.1 and 2 meq/g,
    wherein dosage of the cationic guar is between 2.5 and 50 kg/ha of the soil.

2. The method according to claim 1, wherein the cationic guar is obtained by using quaternary ammonium salt as cationic etherifying agent.

3. The method according to claim 2, wherein the quaternary ammonium salt is chosen from the group consisting of: 3-chloro-2-hydroxypropyl trimethyl ammonium chloride, 2,3-epoxypropyl trimethyl ammonium chloride, diallyldimethyl ammonium chloride, vinylbenzene trimethyl ammonium chloride, trimethylammonium ethyl metacrylate chloride, methacrylamidopropyltrimethyl ammonium chloride, and tetraalkylammonium chloride.

4. The method according to claim 1, wherein the cationic guar is chosen from the group consisting of:
    cationic hydroxyalkyl guar, and
    cationic carboxylalkyl guar.

5. The method according to claim 1, wherein the degree of hydroxyalkylation of cationic guar is between 0 and 3.

6. The method according to claim 1, wherein the Degree of Substitution of cationic guar is between 0.005 and 3.

7. The method according to claim 1, wherein the Charge Density of the cationic guar is between 0.4 and 1 meq/g.

8. The method according to claim 7, wherein the cationic guar has an average Molecular Weight of between about 100,000 daltons and 3,500,000 daltons.

9. The method according to claim 8, wherein dosage of the cationic guar is 10-50 kg/ha of soil.

10. The method according to claim 1, wherein the cationic guar is applied by spray to the soil or blended with the soil, wherein the soil is chosen from the group consisting of: clay soils, sandy soils, silty soils, peaty soils, and loamy soils.

11. A method for preventing water runoff of a soil in need of prevention of water runoff, the method comprising applying on or into the soil a cationic guar,
    wherein the charge density of the cationic guar is between 0.1 and 2 meq/g,
    wherein dosage of the cationic guar is between 2.5 and 50 kg/ha of soil;
    exposing said soil to sufficient water to cause said water runoff absent said application of said cationic guar.

12. The method according to claim 4, wherein the cationic hydroxyalkyl guar is cationic hydroxyethyl guar (HE guar), cationic hydroxypropyl guar (HP guar), or cationic hydroxybutyl guar (HB guar).

13. The method according to claim 4, wherein the cationic carboxylalkyl guar is cationic carboxymethyl guar (CM guar), cationic carboxypropyl guar (CP guar), cationic carboxybutyl guar (CB guar), or carboxymethylhydroxypropyl guar (CMHP guar).

14. The method of claim 1, wherein the soil erosion comprises erosion that occurs as a direct result of at least one weather element of the group consisting of rainfall and wind; wherein said erosion that occurs as a direct result of rainfall is selected from the group consisting of sheet erosion, rill erosion, and gully erosion, further comprising exposing the soil to sufficient said weather element to cause the soil erosion in the absence of said applying of said cationic guar on or in the soil.

15. The method of claim 14, wherein the soil erosion comprises the erosion that occurs as a direct result of rainfall selected from the group consisting of sheet erosion, rill erosion, and gully erosion and the soil is sloped.

16. The method according to claim 1,
wherein the degree of hydroxyalkylation of the cationic guar is between 0 and 1.7;
wherein the degree of substitution of the cationic guar is between 0.01 and 2;
wherein the Charge Density of cationic guar is between 0.4 and 1 meq/g;
wherein the cationic guar has a weight average Molecular Weight (Mw) of between about 500,000 daltons and 3,500,000 daltons,
wherein the cationic guar is chosen from the group consisting of:
cationic hydroxyalkyl guar, and
cationic carboxylalkyl guar;
wherein the cationic hydroxyalkyl guar is cationic hydroxyethyl guar (HE guar), cationic hydroxypropyl guar (HP guar), or cationic hydroxybutyl guar (HB guar);
wherein the cationic carboxylalkyl guar is cationic carboxymethyl guar (CM guar), cationic alkylcarboxy guar, or carboxymethylhydroxypropyl guar (CMHP guar).

17. The method according to claim 1, wherein the degree of hydroxyalkylation of the cationic guar is between 0 and 1.7;
wherein the degree of substitution of the cationic guar is between 0.01 and 2;
wherein the Charge Density of cationic guar is between 0.4 and 1 meq/g;
wherein the cationic guar has a weight average Molecular Weight (Mw) of between about 500,000 daltons and 3,500,000 daltons,
wherein the cationic guar is Hydroxypropyl guar hydroxypropyltrimonium chloride and is applied to the soil at dosage in a range of 10 kg/ha to 50 kg/ha.

18. The method according to claim 17, wherein the Hydroxypropyl guar hydroxypropyltrimonium chloride has a Charge Density of greater than 0.4 to at most 0.5 meq/g, wherein the Hydroxypropyl guar hydroxypropyltrimonium chloride is applied to the soil at dosage in the range of 30 kg/ha to 50 kg/ha.

19. The method according to claim 10, wherein the degree of hydroxyalkylation of the cationic guar is between 0 and 1.7;
wherein the degree of substitution of the cationic guar is between 0.01 and 2;
wherein the Charge Density of cationic guar is between 0.4 and 1 meq/g;
wherein the cationic guar has a weight average Molecular Weight (Mw) of between about 500,000 daltons and 3,500,000 daltons,
wherein the cationic guar is Hydroxypropyl guar hydroxypropyltrimonium chloride and is applied to the soil at dosage in a range of 10 kg/ha to 50 kg/ha.

20. The method according to claim 19, wherein the Hydroxypropyl guar hydroxypropyltrimonium chloride has a Charge Density of greater than 0.4 to at most 0.5 meq/g, wherein the Hydroxypropyl guar hydroxypropyltrimonium chloride is applied to the soil at dosage in the range of 30 kg/ha to 50 kg/ha.

* * * * *